Figure 1:
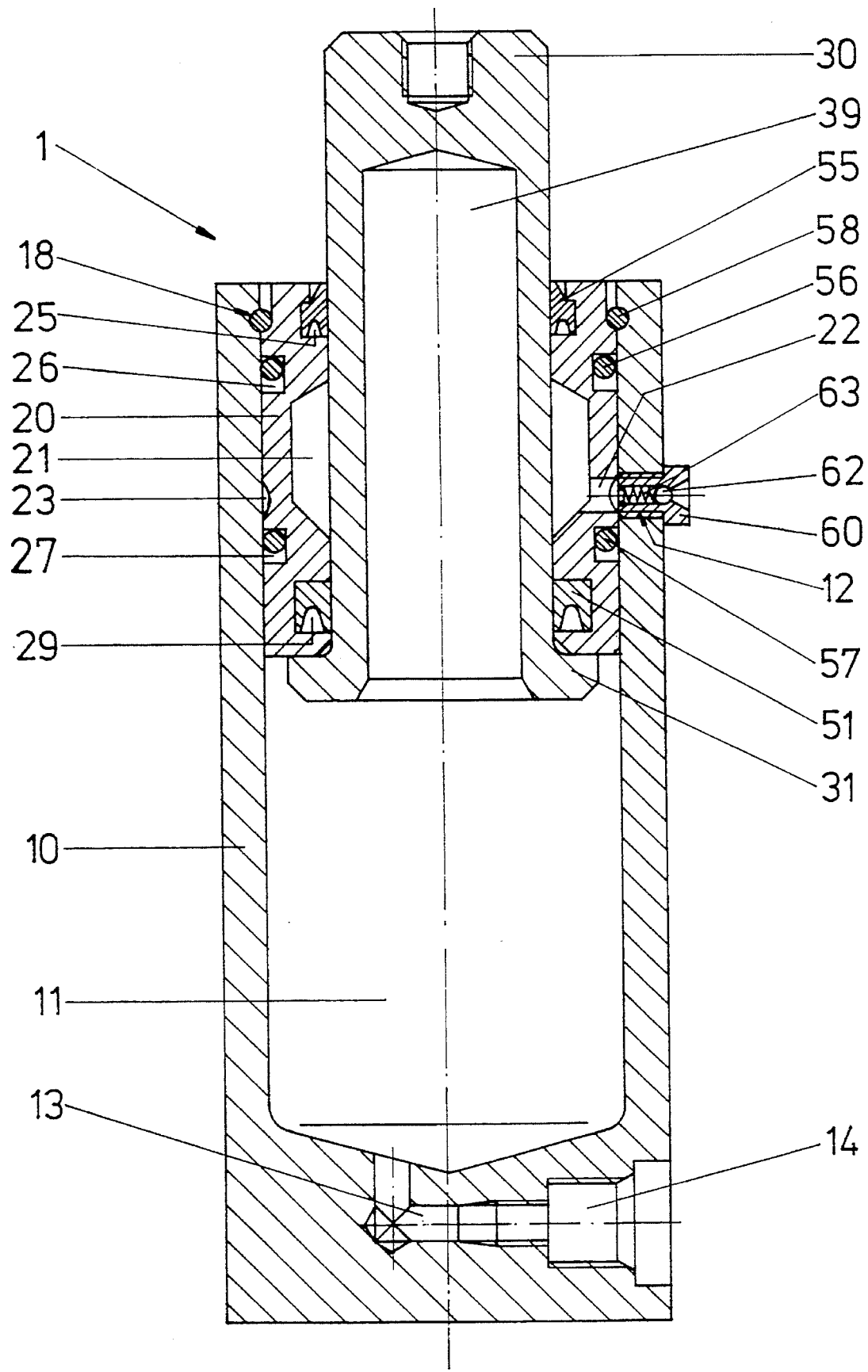

United States Patent [19]
Katz

[11] Patent Number: 5,465,811
[45] Date of Patent: Nov. 14, 1995

[54] SELF-CONTAINED GAS CYLINDER

[75] Inventor: Wolfgang Katz, Dauchingen, Germany

[73] Assignee: Danly Corporation, Coconut Grove, Fla.

[21] Appl. No.: 228,555

[22] Filed: Apr. 15, 1994

[30] Foreign Application Priority Data

Jan. 17, 1994 [DE] Germany .............. 9400669 U

[51] Int. Cl.$^6$ .................................. F16N 1/00
[52] U.S. Cl. .................. 184/24; 92/168; 267/119; 267/130
[58] Field of Search ............... 92/153, 156, 168 R; 184/24, 25; 267/119, 130

[56] References Cited

U.S. PATENT DOCUMENTS

| 345,041 | 7/1886 | Fixary | 184/24 |
|---|---|---|---|
| 1,928,448 | 9/1933 | Fox | 184/24 |
| 2,480,229 | 8/1949 | Dow | 184/24 |
| 2,572,952 | 10/1951 | Rymal | 184/24 |
| 3,540,741 | 11/1970 | LeFebvre | 92/168 |
| 4,005,763 | 2/1977 | Wallis | 184/24 |
| 4,076,103 | 2/1978 | Wallis | 184/25 |
| 5,086,691 | 2/1992 | von Hatten | 92/168 |
| 5,305,854 | 4/1994 | Wheeler | 184/24 |

FOREIGN PATENT DOCUMENTS

| 100022 | 11/1898 | Germany | 184/24 |
|---|---|---|---|
| 9007590 | 1/1992 | Germany. | |
| 11408 | of 1896 | United Kingdom | 184/24 |

*Primary Examiner*—Thomas E. Denion
*Attorney, Agent, or Firm*—Dominik & Stein

[57] ABSTRACT

A gas cylinder element having a replenishable lubrication means provided in the piston rod guide bushing. The gas cylinder element has an extended life expectancy and reduced manufacturing cost.

10 Claims, 2 Drawing Sheets

SELF-CONTAINED GAS CYLINDER

The invention concerns a gas cylinder element of the type set forth in the preamble of claim 1.

This type of gas cylinder element has been used particularly where a high return force is to be realized in a small space, for example, in machine tools or tools. The gas cylinder elements are comprised essentially of a cylinder with an annular bore having a piston rod therein. The piston rod extends axially through an end face of the cylinder and is directed through the cylinder housing via a sealing means for sealing engagement. Within the cylinder there is formed a closed work space, which is filled with gas under high pressure. Beginning from the top dead center, i.e., the zero or rest point, the piston rod is axially displaceable. The direct consequence of an axial displacement of the piston rod is a reduction in the volume of the closed work space, and a reduction in the closed work space volume results in an increase in pressure of the gas, so that with increasing incremental inwardly directed axial displacements an increasing amount of force is required for the same amount of further displacement, and therewith the desired spring-action is achieved.

One such gas cylinder element in the form of a self-contained pneumatic spring is known from the disclosure of, for example, DE 90 07 590 U. A gas, namely nitrogen, is directed into the cylinder under high pressure by means of a vent. In the upper part of the cylinder there is, at the point of introduction of the piston rod, an integral lubricant supply chamber having the form of a perforation, which serves as a lubricant supply source. The manufacturer provides a pasty lubricant, such as a lubricating grease. As a consequence of the reversing sliding movements of the piston rod, small amounts of lubricant are constantly being taken along and prevent thereby the rubbing where the piston rod penetrates through the cylinder.

Although such a gas cylinder element has proven itself to be useful in practice, there nevertheless remain a number of disadvantages. On the one hand the production thereof is relatively expensive, since the cylinder must be specifically constructed in the area of the through-passage. In particular the provision of the perforation which serves as the lubrication supply chamber requires an additional production process step. Further, it has been discovered that the lubricant supply provided by the manufacturer is relatively rapidly used up, so that, particularly under strenuous loads and/or extended use, the rubbing between the piston rod and the through-passage gets worse and wearing increases. The problem is also attributable in part to the fact that pasty lubricants can not provide a uniform lubricating film upon the surface to be coated and therefore local discrete areas having no lubricant can occur. Also, the viscosity results in the rapid carrying of the permanent lubricating material away from the lubrication supply chamber, so that the supply is rapidly depleted. A refilling of the lubrication material is not possible and would not be economically feasible due to the high reassembly cost.

The invention thus addresses the problem of further developing the gas cylinder elements of the type already known in the art, in order to obviate the aforementioned problems. In particular a gas cylinder element is to be provided, which has an extended life as compared to conventional gas cylinder elements and which can be produced more economically.

The problem is solved with a gas cylinder element which exhibits the features as set forth in claim 1.

The invention is based upon the idea, to simplify the construction steps of the cylinder thereby, that the area of introduction of the piston rod is constructed in the form of a separate guide bushing, which is insertable into an annular bore of substantially constant diameter. The guide bushing is provided with a recess for the reception of lubricants, whereby though additional closable channels lubricants can be resupplied from externally. Thereby lubricant can be added as necessary, without the requirement to dismantle the gas cylinder element.

Further there is provided between the piston rod and the piston rod sealing and guiding bushing a relatively narrow gap, so that use may be made of a fluid lubricant, for example in the form of a high-pressure resistant synthetic oil. Thereby it is possible to provide a thin, yet long lasting and highly cohesive lubricating film, which substantially extends the operating life. At the same time the reduction in friction attained by means of the present invention directly results in a lessening in the amount of heating of the gas which is present under pressure in the work space, so that any mechanical loading as a result of the temperature dependent pressure increase is not as pronounced. There is also observed a better spring characteristic, so that in spite of the increased operating life the manufacturing expenditure can be reduced.

The piston rod is uniformly guided over a long axial displacement by means of the guide bushing, and lateral forces are thus better received and tolerated. The conventional guide rings can be entirely dispensed with, so that the loading and thereby the friction can be further reduced.

In the concrete realization of this basic idea the cylinder has an annular bore of constant diameter, which beginning at the cylinder face extends within the cylinder axially along most of the length thereof. Consequently, the guide bushing is provided with a corresponding outer diameter, so that it can be seated in the annular bore. The inner diameter of the guide bushing is exactly dimensioned to correspond to the piston rod, such that only a small amount of radial play exists between the two parts.

The guide bushing is provided in the middle zone with an annular recess, which is facing the piston rod. Further there is provided a relatively radially oriented lubricant channel, which opens into the recess. In correspondence thereto an inlet bore hole is provided, which is oriented essentially radially and is in communication with the lubrication channel of the guide bushing. The inlet bore hole can be closed off towards the outside.

By these means lubricant can be introduced or replenished from the outside at any time. In particular liquid lubricants can be filled in using simple means and in simple manner, so that the recess as well as the associated lubricant channel and bore hole serve as lubricant reservoirs. The close tolerance between the inner wall of the guide bushing and the piston rod permits on the one hand the building up of a contained lubrication film, and prevents on the other hand the premature loss of the lubricant from the area of the recess.

It is preferred that the inlet bore hole is provided with a self-closing lubricant nipple (zirk fitting), which is an inexpensive and readily available part and makes possible the simple replenishment of lubricant and which at the same time, preferably by means of a spring biased ball, securely closes off the opening.

In accordance with a further preferred embodiment the guide bearing is provided on the outside, that is, on the shell, with a circumscribing ring groove, which is in communication with the lubricant channel. The height, that is, the axial positioning, of the ring groove corresponds to the position of the inlet bore hole in the cylinder. This makes possible the particularly simple and separate production of the cylinder and guide bushing, since it is not necessary to be concerned with the relative angles of rotation of the two parts while seating of the guide bushing in the cylinder in order to establish a connection between the lubricant channel and the inlet bore hole. Communication is established from the inlet bore hole first to the ring groove, which is defined by the area in the zone of the ring groove between the cylinder and the guide bushing, and thereafter proceeds into the lubricant canal.

Preferably the radial play between the guide bushing and the piston rod is selected in the range between 0.02 and 0.04 mm. This permits on the one hand the development of the abovedescribed lubrication film and on the other hand prevents that a high pressure seal ring which is to be provided in this area is drawn into the gap and thereby prematurely worn out.

Further preferred embodiments are concerned with the optimal design of the high pressure seal means. This is of particular importance, since operating pressures in excess of 150 bar may occur.

Accordingly, the high pressure seal means can be provided between the piston rod and the guide bushing below the recess which is designed as the lubricant supply source. For this, a circumscribing groove can be provided in the guide bushing facing the piston rod and into which the high pressure seal ring is seated. A construction of this type has the advantage, that the lubrication system, comprised of the recess inclusive of the channels, does not operate in a pressurized condition and thus lubricant can be added at any time, that is, even during ongoing operation. Besides this, since the supply inlet closing element is under hardly any pressure, it can be constructed of simple means. Additionally, a design of this type has the advantage that damage of the piston rod, as may occur in industrial operation, in general would not reach the high pressure seal and thus would not subsequently cause damage thereto.

With the above-described concept it is not only possible to significantly improve the gas cylinder elements as used in practice up till now, which are based upon the use of piston rods or plungers. In accordance with a further variation of the invention the seal to the working space is not provided via the sealing means between the piston rod and the guide bushing, but rather via a piston, which is connected to the piston rod and is disposed in the bore. The sealing can thus be preferably accomplished by means of a high pressure seal ring, which is set into a circumscribing groove which is provided in the outer surface of the piston. Thereby the sealing of a piston having a relatively greater surface area by virtue of it's greater outer diameter is accomplished. Also, a damaging of the sealing ring due to external influences is no longer possible, since the sealing means is in contact with the inner surface of the bore which acts as a cylindrical guide surface. A further advantage exists therein, that as a consequence of the greater working area a much greater spring force is attainable with the same cylinder, i.e., annular bore, diameter. In this embodiment a high pressure seal means is no longer required in the guide bushing, so that it serves exclusively for guiding of the piston rod.

Figure 2:
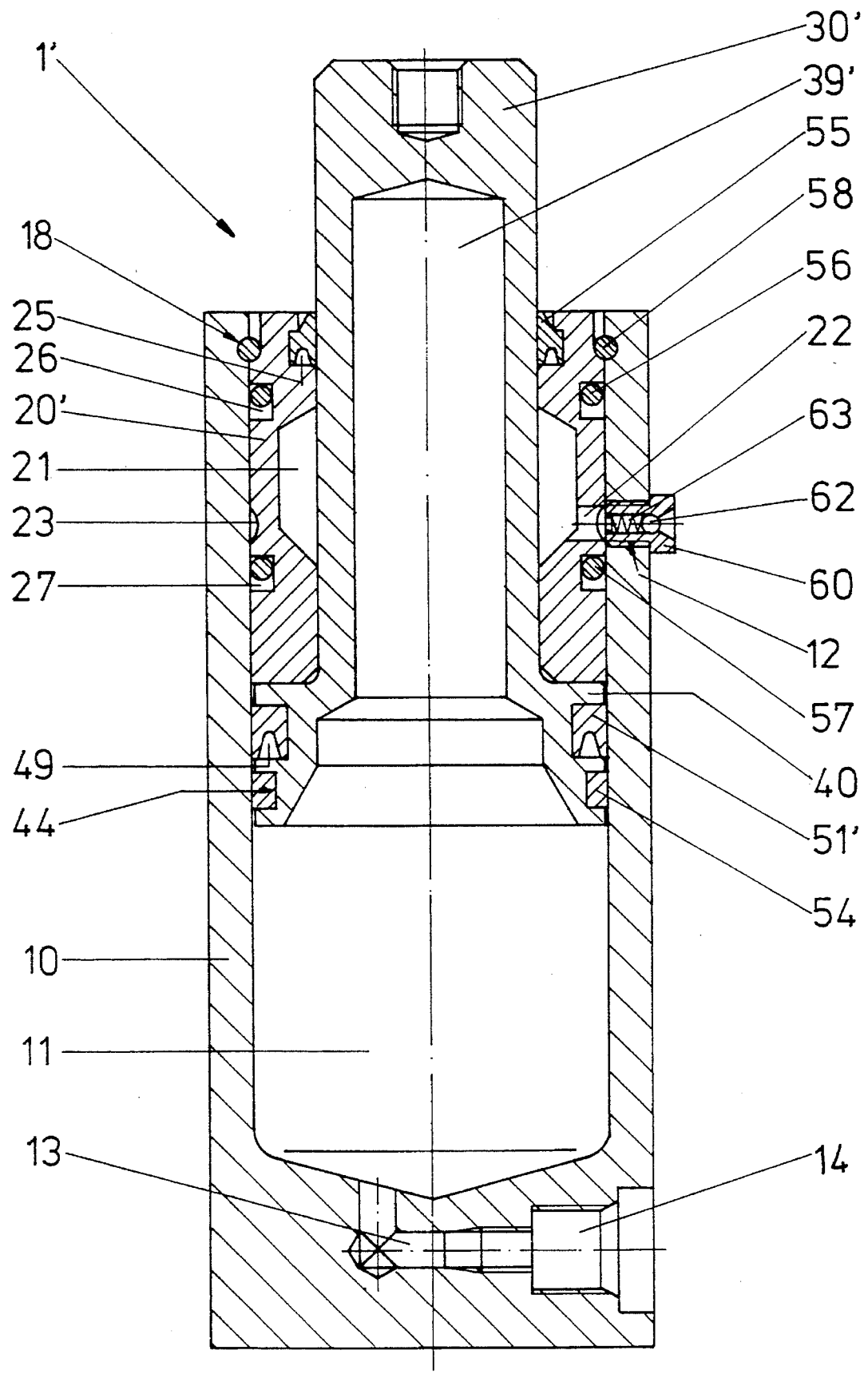

The invention is next discussed in greater detail by reference to the embodiments represented in the figures. There are shown in schematic cross section:

FIG. 1 gas cylinder element constructed as plunger and
FIG. 2 gas cylinder element constructed as piston.

The gas cylinder element 1 according to FIG. 1 is a so-called plunger version, in which a piston rod 30 is used for the realization of the spring effect. The piston rod 30 passes through the annular bore 11 of a cylinder 10. The piston rod 30 projects above the cylinder 10 axially upwardly and is axially slidably supported with respect thereto. In the inside of the cylinder 10 a closed work space is created by the guiding and sealing engagement of the piston rod 30, which closed work space is filled with gas, which is under high pressure. The gas can be introduced by means of a gas supply valve which need not discussed herein in greater detail, which is obviously self locking and which is seated in a valve receptacle bore channel 14 in the cylinder 10. The valve receiving bore channel 14 transitions to a gas supply channel 13, which communicates from below with the annular bore 11. Nitrogen gas under high pressure is introduced through the gas valve and attains within the working space 11 a pressure of approximately 150 bar. The gas valve further makes possible the later introduction of gas in order to, for example, recharge gas which has been lost during operation or to adjust the charge of gas to a predetermined value corresponding to a specified working load.

The piston rod 30 is inserted through guide bushing 20, which itself is seated in the annular bore 11. The guide bushing 20 is secured by means of a retaining ring 58, which is seated in a groove 18 in the cylinder 10. The retaining ring 58 is constructed as a round wire circlip according to DIN 7993. This industrial standard also defines in detail the geometry of the groove 18.

In place of the retaining ring 58 the guide bushing 20 can also be retained by means of treading, namely by means of an inner threading in the cylinder 10 and a corresponding outer winding in the guide bushing 20 (not shown).

The guide bushing 20 shows in the exterior surface two circumscribing grooves 26, 27, which are axially spaced. In these are seated O-rings 56, 57 which serve for the sealing engagement between the guide bushing 20 and the cylinder 10. The O-rings 56, 57 are commercially available under the name "Parker . . . N357-80" and possess a Shore hardness value of 82.

The internal diameter of the guide bushing 20 is exactly machined to correspond to the piston rod 30, in order to provide a radial gap of approximately 0.02 to 0.04 mm. It thus serves directly as a sliding bearing for the piston rod 30 and is therefore manufactured from bearing bronze "RG 7". On its upper end, oriented towards the cylinder face, there is provided an internal circumscribing groove, in which a sealing ring 55 is seated. The sealing ring 55 is commercially available under the name "Parker AY . . . P5008" and possesses a Shore hardness of 92. The sealing ring 55 serves to retain the lubricant adhering to the piston rod during an upwards movement.

Lying on the other side, that is, the bottom end of the guide bushing 10, there is provided an inwardly circumscribing groove 29. Therein is provided a high pressure sealing ring 51, which securely provides a positive sealing of the working space 11 in the contact area between the guide bushing 10 and the piston rod 30. The high pressure sealing ring 51 is commercially available under the name "Parker BS . . . P5008" and possesses a Shore hardness of 92. The placement at the bottom part of the guide bushing 20 has the advantage, that in the case of a damage to the piston rod 30 in the peripheral area as a result of external actions no danger exists, that the high pressure sealing ring 51 is mechanically damaged and is prematurely worn out. The desired sealing is therefore maintained during the entire projected life.

An inner annular recess 21 is provided between the two grooves 25, 29. This is intended to receive lubricant, so that a continuous lubrication of the piston rod is provided for. Through the provision of recess 21 above the high pressure sealing ring 51 this area is not maintained under high pressure, that it, it is maintained under ambient pressure. This has the advantage, that the lubricating material can be supplied at any time, and thus also during ongoing operations, without the requirement of any particular safety measures.

The lubricant contained in the recess 21 adheres to the piston rod 30 as it passes by and forms a confined lubricating film in the radial cleft between the guide bushing 20 and the piston rod 30. The sealing ring 55 and the high pressure sealing ring 51 prevent the exudation of lubricant, so that the consumption of lubricant is minimal even under high loads and high load cycling. As lubricants, particularly suitable are viscous fluid synthetic gear oils, such as for example those which are commercially available under the classification "Motorex Gear-Synt. Nr. 460".

In the guide bushing 20 there is provided a radially extending lubricant channel 22, which begins at the annular ring canal 23 provided in the guide bushing and extends through the guide bushing 20 and opens into the recess 21. The lubricant channel 22 and the ring canal 23 are provided at the same height as a supply inlet borehole 12, which radially extends through the cylinder 10. There is thus provided a continuous communication between the outer surface of the cylinder 10 and the recess 21. The axial position is so selected, that it lays between the O-rings 56, 57 and thereby is sealed against the closed working space 11. In the supply inlet borehole 12 there is provided a lubricant nipple 60. Therewith it is possible to introduce lubricant from the outside, or as the case may be, to resupply lubricant even during the ongoing operation. At the same time the lubricant nipple 60 closes off the lubricant reservoir against the outside. As the lubricant nipple a normal lubricant nipple according to DIN 3405-A can be used. This contains in a void 61 a ball 62 held by a spring 63, so that an unintentional loss of lubricant is positively prevented.

In the configuration shown in FIG. 1 the piston rod 30 is shown in the rest position, that is, in the upper dead point position. This is defined by the abutment of the shoulder 31 formed on the piston rod 30 on the bottom face surface of the guide bushing 20. The unloaded piston rod 30 is held in this position by the nitrogen gas contained in the working space 11 under high pressure.

The piston rod 30 is largely axially and radially penetrated by a bore 39. It is therewith an integral part of the closed working space 11, which volume is thereby correspondingly enlarged. This produces a substantially better spring rate since during the given sliding movement less of a compression and thus less of a temperature increase of the nitrogen gas is achieved.

The conventional screw-cap end was also eliminated, so that a cumulatively greater working space with the attendant above described advantages can be realized. Also, as a result of elimination of the screw cap, a source of leakage has been avoided, since heretofore the screw-caps have had to be sealed by means of an O-ring. With respect to production methods, advantages can be gained by the use of modern machining methods. Accordingly, for the purposes of this embodiment it is preferred to use a material with the designation ETG 88 of the company Moos Stahl AG, Lucern, Switzerland, which has the desired strength characteristics and which at the same time is readily workable. For the piston rod 30 a normalized steel with the designation 1.7131 is used.

In FIG. 2 a second, piston-based variation of the gas cylinder element 1' of the invention is shown. It differs from the above-described gas cylinder element 1 essentially in that, in place of the piston rod 30 (plunger) now a piston rod 30' with a one piece integral piston 40 is used. The remainder of the construction essentially corresponds, so that in the following discussion is primarily concerned with those features which differ. The corresponding features are assigned the same reference numerals, and a repetition thereof is not necessary.

The piston 40 is provided in the outer circumference with a groove 44, in which a guide ring 54 is seated. This has the function of spacing the piston 40 from the inner wall of the annular bore 11 in the cylinder 10 and to serve as a guide. Immediately thereabove there is provided a groove 49, which receives a high pressure sealing ring 51'. With respect to selection of material and function, the high pressure sealing ring 51' corresponds to the high pressure sealing ring 51 of the above-described version of the invention. It is therefore also preferred to use a commercially available high pressure sealing ring available under the tradename "Parker AY . . . P5008" with a Shore hardness of 92. A further high pressure sealing ring in the lower area of the guide bushing can therefore be dispensed with.

The piston based variation has the advantage, that a yet better high pressure sealing is attainable, since this is provided in a more radially extended position and thus a greater sealing area is attained. As compared to the preceding plunger variation, there results from the present geometric relationships a 2.5 to 3 fold increase in the sealed surface area. Also, the high pressure sealing is completely independent from the condition of the piston rod 30', so that damage which would eventually occur to the piston rod would have no effect on the life span of high pressure sealing ring 51'. Also, it becomes possible with this otherwise comparable dimensioning to substantially increase the spring pressure, since the working surface is much larger.

Also here, for the increasing of the volume of the closed work space 11, the guide rod 30' and the piston 40 are extensively further bored out.

The described concept makes it possible with simple means to put into practice both variations, that is, to undertake a reconfiguration from one variant to the other. Thus it is possible in principle, keeping the same cylinder 10 and the guide bushing 20, to substitute the piston rod 30 with the piston rod 30' with integrated piston 40, and vise versa.

| REFERENCE NUMERAL LIST | |
| --- | --- |
| 1, 1' | Gas Cylinder Element |
| 10 | Cylinder |
| 11 | Annular Bore |
| 12 | Supply Inlet Borehole |
| 13 | Gas Inlet Canal |
| 14 | Receiving Bore Channel |
| 18 | Groove |
| 20, 20' | Guide Bushing |
| 21 | Recess |
| 22 | Lubricant Channel |
| 23 | Ring Canal |
| 25 | Groove |
| 26 | Groove |
| 27 | Groove |
| 29 | Groove |
| 30, 30' | Piston Rod |
| 31 | Shoulder |
| 39' | Bore |
| 40 | Piston |
| 44 | Groove |
| 49 | Groove |

| -continued | |
|---|---|
| REFERENCE NUMERAL LIST | |
| 51, 51' | High-Pressure Sealing Ring |
| 54 | Piston Guide Ring |
| 55 | Sealing Ring |
| 56 | O-Ring |
| 57 | O-Ring |
| 58 | Retaining Ring |
| 60 | Lubricant Nipple |
| 61 | Void |
| 62 | Ball |
| 63 | Spring |

I claim:

1. A gas cylinder element comprising:

a cylinder having an annular bore (11);

a piston rod capable of a sliding movement axially within and relative to the cylinder;

a guide bushing (20, 20') seated at one end face of the cylinder for sealingly engaging said piston rod and through which said piston rod extends into said cylinder;

said guide bushing, cylinder, and piston rod defining an enclosed working space for containing gas under pressure, against which pressure the piston rod can be urged to provide a spring effect;

wherein said guide bushing (20, 20') is provided with an annular recess (21) facing the piston rod for receiving lubricant, said guide bushing further having an annular passage through which the piston rod passes with small radial tolerance between the piston rod and guide bushing, the guide bushing (20, 20') further being provided with an essentially radially extending lubricant channel (22), which at one end is in communication with the recess (21) and at the other end is in communication with a closeable lubricant supply inlet borehole (12) extending essentially radially through the cylinder (10).

2. A gas cylinder element as in claim 1, wherein said lubricant supply inlet bore (12) is provided with a self closing lubricant nipple fitting.

3. A gas cylinder element as in claim 1, wherein said guide bushing is provided with an axial annular ring canal (23) which connects and provides communication between the lubricant channel (22) and the supply inlet borehole (12), the axial position of which corresponds with that of the supply inlet borehole (12).

4. A gas cylinder element as in claim 1, wherein the radial tolerance between the guide bushing (20, 20') and the piston rod (30, 30') is within the range of from approximately 0.02 to approximately 0.04 mm.

5. A gas cylinder element as in claim 1, wherein the recess (21) is insulated from the high pressure of the work space (11).

6. A gas cylinder element as in claim 1, wherein said guide bushing (20) is provided with an annular groove (29) in which a high pressure sealing ring (51) is seated, said groove being underneath the recess (21) and facing the piston rod (30).

7. A gas cylinder element as in claim 1, wherein said piston rod (30') is provided with a piston (40) which is disposed in the annular bore (11).

8. A gas cylinder element as in claim 7, wherein said piston (40) and the piston rod (30') are manufactured as a single piece.

9. A gas cylinder element as in claim 7, wherein said piston (40) is provided with an annular groove (49), in which a high pressure sealing ring (51') is seated.

10. A gas cylinder element as in claim 7, wherein said piston rod (30, 30') and piston (40) is substantially bored out.

* * * * *